United States Patent [19]

Lemelson

[11] Patent Number: 4,991,205
[45] Date of Patent: Feb. 5, 1991

[54] PERSONAL IDENTIFICATION SYSTEM AND METHOD

[76] Inventor: Jerome H. Lemelson, 868 Tyner Way, Call Box 14-286, Incline Village, Nev. 89450

[21] Appl. No.: 62,378

[22] Filed: Jun. 15, 1987

Related U.S. Application Data

[60] Continuation of Ser. No. 837,339, Feb. 28, 1986, abandoned, which is a continuation of Ser. No. 663,788, Oct. 23, 1984, abandoned, which is a continuation of Ser. No. 285,907, Jul. 23, 1981, abandoned, which is a continuation of Ser. No. 78,166, Sep. 24, 1979, abandoned, which is a division of Ser. No. 78,167, Sep. 24, 1979, which is a continuation-in-part of Ser. No. 225,173, Aug. 27, 1962, and Ser. No. 885,264, Mar. 10, 1978, which is a continuation-in-part of Ser. No. 458,879, Apr. 8, 1974, Pat. No. 3,943,563.

[51] Int. Cl.$^5$ .................. H04N 7/167; H04N 5/78; G06K 5/00; H04M 11/00
[52] U.S. Cl. .................. 380/5; 235/382; 340/825.33; 340/825.34; 360/35.1; 379/91; 380/18; 380/15; 380/10
[58] Field of Search .............. 379/91; 340/825.33, 340/825.34; 235/382; 360/35, 35.1; 380/10, 15, 18, 5

[56] References Cited

U.S. PATENT DOCUMENTS 3,513,298 5/1970 Riddle et al.
3,742,451 6/1973 Graham et al.
3,752,904 8/1973 Waterbury.
3,985,998 10/1976 Crafton.
4,078,154 3/1978 Suzuki et al.
4,136,261 1/1979 Wada.
4,179,686 12/1979 Bonicalzi.
4,222,068 9/1980 Thompson.

Primary Examiner—Stephen C. Buczinski
Attorney, Agent, or Firm—Neil F. Markva

[57] ABSTRACT

A personal identification system and a method for verifying a person presenting a record member such as a credit card or other member so as to eliminate fraud from the procedure. The record member or card contains invisible magnetic recordings of a full frame video picture signal and code defining signal recordings which, when reproduced by transducer sensing, may be employed to operate a motor or solenoid for access to a room or building. The video picture signal may contain image information derived from scanning the face of the person presenting the record member, his signature or other physical characteristic, which may be used to modulate an image generating device such as a cathode ray tube and present such image for verification. The reproduced code signal may also be employed for verification by matching same with another code generated by keyboard or from a memory. In another form, the recordings on the record member may be derived from a microphone into which the person to be identified speaks. Such recordings may be obtained from analog speech signals which are digitized and scrambled for security purposes.

14 Claims, 3 Drawing Sheets

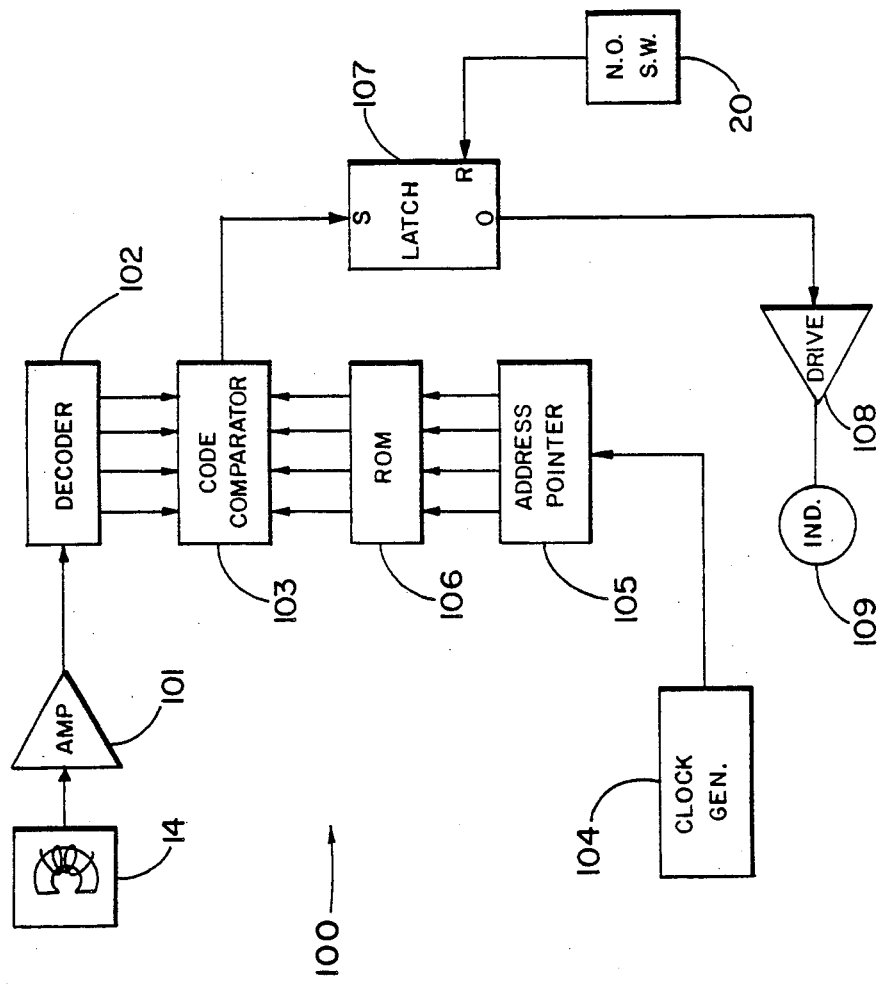
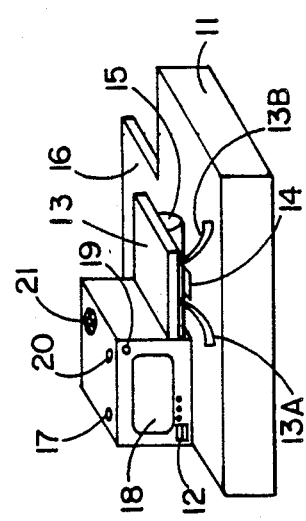
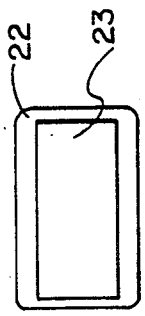
FIG. 5
FIG. 1
FIG. 2

4,991,205

PERSONAL IDENTIFICATION SYSTEM AND METHOD

This application is a continuation of 06/837,339 filed 28 Feb. 1986 (now abandoned), which is a continuation of 06/663,788 filed 23, Oct. 1984 (now abandoned), which is a continuation of 06/285,907 filed 23 July 1981 (now abandoned), which is a continuation of 06/088,166 filed 24 Sept. 1979 (now abandoned), which is a divisional of 06/078,167 filed 24 Sept. 1979, which is a continuation-in-part of first 04/225,173 filed 27 Aug. 1962 and second 05/885,264 filed 10 March 1978, which is a continuation-in-part of 05/458,879 filed 8 April 1974, now U.S. Pat. No. 3,943,563.

SUMMARY OF THE INVENTION

This invention relates to a personal identification system and method for identifying persons subscribing to such system by processing electrical signals derived from recordings of physical characteristics of the person such as voice generated signals or television signals which are digitized and scrambled for security purposes. In one form, a video picture signal of the face and/or signature of a person is digitized and scrambled and the scrambled signals recorded along a track of a record member such as a magnetic strip secured to a credit card, badge, passbook or personal check. When automatic identification is desired to be made the scrambled recording is scanned to reproduce a scambled electrical signal which is processed to unscramble it. The unscrambled electrical signal derived from the record member is then either employed to modulate a display such as a cathode ray tube to generate an image of the original information such as the image of the face of a person or the persons signature or is compared with a signal derived from detecting a physical characteristic or phenomenon such as the voice of the person detected by a microphone.

Accordingly it is a primary object of this invention to provide an automatic personal identification system employing electronic means for verifying and authenticting a person presenting a record member to a clerk or guard for use to gain entry to a premise or to authenticate the person for making a purchase or cashing a check.

Another object is to provide a personal identification and verifying system employing secret scrambled or otherwise rendered unintelligible recordings of physical characteristics of a person provided on a record member in a form which may be easily reproduced from such record member. The reproduced recordings are presented to a reader and electrically processed or unscrambled so as to generate an image of the face of the person to permit the identification and monitoring of the person presenting the record member to a clerk, guard or automatic scanning device.

Another object is to provide a system and method for identifying persons employing recordings on a record card which recordings are unintelligible in the form they are recorded and may be used to electronically generate an image of the card owner, so as to prevent a person other than the card's owner to use the card illegally.

Another object is to provide a credit card recording and reproduction system for rapidly and easily recording signals relating to a physical characteristic of the card owner on the card which recording may be reproduced by specialized equipment and employed to generate images of the face and signature of the card owner.

Another object is to provide a personal identification system which does not employ photographic images of the faces of persons for identification, thereby retaining a certain degree of privacy for the persons subscribing to or using the system.

Another object is to provide a magnetic recording and reproduction system for signatures and/or images of the faces of persons, wherein the signals which are magnetically recorded are processed in a manner such that they are not directly reproducible and utilizable to produce intelligible images without proper processing by special and secret electronic circuits thereby eliminating the possibility of fraud or counterfeiting.

With the above and such other objects in view as may hereinafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is an isometric view of a magnetic card reading and display apparatus defining the present invention.

FIG. 2 is a plan view of a typical record or credit card employed in the system shown in FIG. 1.

FIG. 5 is a schematic diagram illustrating a modified form of the system shown in FIGS. 3 and 4.

In FIG. 1 is shown details of a personal verification system 10 for electronically identifying and verifying persons who present credit cards, passbooks, badges or other form of documents to permit access of such persons to security locations or to complete a transaction such as the purchase of goods and services, the passing of checks or other transactions. The system 10 includes a housing 11 which contains electronic circuits to be described and supports a manual on-off switch 12, a card reading device 13 which includes guides 13A and 13B for a magnetic record card 22, illustrated in FIG. 2. A magnetic reproduction head assembly 14 is adapted to read magnetic recordings on card 22 when it is driven therethrough by a pressure roller 15 to a card receiving table 16. A limit switch 17 activates the card reading circuit when card 22 is inserted into the reading unit. A display 18, a verification indicating lamp 19, a reset switch 20 and a microphone 21 are adjacent the card reading device 13.

In FIG. 2 is shown details of a typical record or credit card 22, containing a magnetic recording material 23 coated on or laminated to one surface thereof and permanently recorded with a digitally coded, and preferably scrambled representation of a selected spoken word or words of the person owning the card and/or a video picture signal, such as an analog signal or digital signals derived from scanning the face of such person with a television camera.

In FIG. 3 is shown a schematic diagram of one possible arrangement of the verification system 10 which employs automatic means for effecting the voice identification of the subscriber or owner of the card. Operational current from a suitable power supply 24, such as a battery or source of line current, is supplied when switch 12 is closed to activate the various circuits of system 10. Monitoring or checking is effected by a salesperson, teller or clerk hereafter referred to as an operator, who inserts the magnetic record card of a person to be verified, into the card reader 13 between guides 13A and 13B and depresses read switch 17 which operates a motor powering roller 15 to drive the card 22 past the read head assembly 14 and thereafter on to table or circuit 16. Closure of switch 17 sets a latch 25, the output of which activates a motor drive circuit 26 transferring operational power to motor 27 which drives the roller 15 to power drive card 22 through reader 13.

Figure 3:
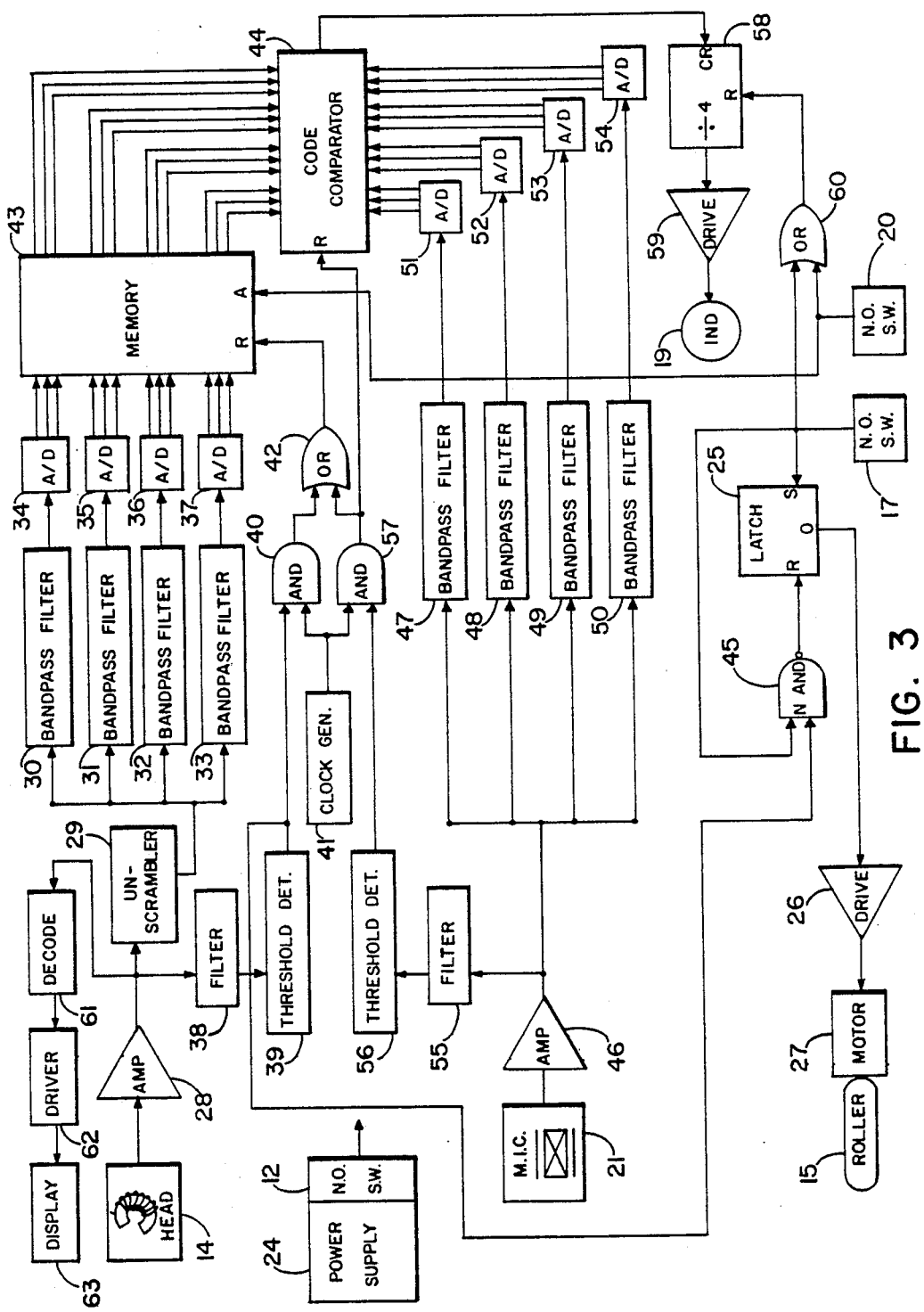
FIG. 3 is a schematic diagram showing electronic components of a personal identification system employed in the apparatus of FIG. 1.

As the magnetic recording of the track of the magnetic recording material 23 of the card 22 passes the reproduction head assembly 14, the magnetically recorded signals on the card are transduced to electrical signals which are amplified by an amplifier 28 and conducted to an unscrambler circuit 29 which electronically processes the signals and presents them in intelligible forms by means known in the art.

From the unscrambling circuit 29, the signals are passed to a bank of band pass filters 30, 31, 32 and 33 which are operable in the vocal frequency range and are respectively connected to analog-to-digital converters 34, 35, 36 and 37 which convert the signal levels of the respective signals generated on the output of such band pass filters to digital signals which represent the volume densities of sound at the particular pass band frequencies, by the voice of the owner of the card.

The output of amplifier 28 is also conducted to a filter 38, the output of which is representative of the presence or absence of a signal at the output of the amplifier 28 and provides a DC signal level which is indicative of the amplitude of the signal presented to a threshold detector 39. Threshold detector 39 provides a true signal on one input to an AND gate 40 whenever its input from filter 38 exceeds a certain preset level, thereby indicating the actual presence of information picked up as the card 22 is driven past and magnetic reproduction head assembly.

The other input to the AND gate 40 is activated by clock pulses of appropriate frequency from a clock generator 41. When coincidence exists between the true signal received from the threshhold detector 39 and the clock generator 41, AND gate 40 transfers the clock pulses to an OR gate 42 which conveys such clock pulses to the read input of an electronic memory 43, such as one containing a series of recirculating shift registers or other form of memory, enabling the registers of such memory to accept the data received, coincident at the time each pulse is received from the analog-to-digital converters 34 to 37 and to advance each previously read bit of data in sequence until all shift registers of the memory 43 are filled. The output of memory 43, representing the output of its internal shift registers, comprises one input to a code comparator circuit 44, the other inputs to which circuit 44 will be described.

When the recordings on the card being read have completely passed the magnetic reproduction heads 14, the threshhold detector 39 senses the absence of input signals and resumes its formal output state generating an output voltage which is transmitted to one input of a NAND circuit 45, the other input to which extends from read switch 17. When both inputs to the NAND circuit 45 are inactive, such circuit provides a reset signal to latch 25 causing the deactivation of the latch output and cessation of drive current for the motor 27 terminating its operation.

When the information has been reproduced from card 22 and has been disseminated and stored in memory 43, as indicated, the operator instructs the person presenting the card to speak the code word or phrase into a microphone 21 which converts the spoken sound or sounds to electrical signals which are amplified by an amplifier 46. The amplifier the output of which is fed to an array of band pass filters 47, 48, 49 and which have characteristics respectively identical to those of filters 30, 31, 32 and 33. The same filters may be used for both the functions described and to be described. The outputs of such band pass filters 47 to 50 are connected respectively to analog-to-digital converters 51, 52, 53 and 54 which digitize such signals and pass then to respective inputs of code comparator 44.

The signals generated by the speech sounds transduced by the microphone 21 are processed after they are amplified by an amplifier 46. The amplifier output extends not only to the band pass filters 47 to 50 but also to a filter 55 which senses the amplitude of such signals and converts same to a DC signal of related amplitude. The DC level of the DC signal is sensed by a threshold detector 56 which is triggered when a preset level is reached. The output of such threshhold detector 56 provides a true signal to one input of an AND gate 57, the other input to which AND gate is derived from clock generator 41. Clock pulses from generator 41 are transferred to the output of AND gate 57 whenever they are coincident with a true signal from threshhold detector 56 and are passed therefrom to both the read input R of code comparator 44 and through an OR gate 42 to the read input R of memory 43. Receipt of such clock pulses by memory 43 causes the memory to circulate its information, which is made available to the comparator 44 and enables such comparator to compare the codes received from the memory 43 with those present at its inputs from the analog-to-digital converters 51 to 54, thus providing a true output when and if such codes match or are coincident.

As an illustrative example of operation, four sampling periods defined by clock pulses from generator 41, will be described in which the codes read from card 22 are processed. This provides four true signals from comparator 44, necessary to verify the authenticity of the signals generated from the words spoken by the card holder into the microphone. To accomplish such processing, a divide-by-four circuit 58 has its clock input connected to the output of comparator 44. When four true input pulses are presented to divider 58, a true signal appears at its output which activates a lamp driver 59 which then provides operational current for energizing lamp 19 serving as a verification indicator. Thus the operator notified of the verification of the person presenting the card.

System 10 may be reset for its next operation by actuation of a normally open monostable switch 20 which generates a reset pulse which clears memory 43 when transmitted to the clear input A of such memory and to the reset input R of counter 58 through OR gate 60. Counter 58 is also reset each time the read switch 17 is activated, when its output signal is passed to the reset input of the counter through OR gate 60.

In addition to the described audio information recorded on the card 22, a digital code representative of a particular number or series of characters known only to the owner of the card, may also be recorded on the card to be reproduced and employed to selectively activate a digital display. Such codes may be reproduced by one of the magnetic pickup heads of the bank 14 thereof and applied to amplifier 28. The amplifier output is connected to a decoder 61 which is connected to a display driver 62 for driving a digital display 63 which may be visually read by the operator to verify a number or series of characters presented to him by the card holder. The display 63 may be composed of a series of electronic character display units such as numerical or alphanumerical light emitting diode or liquid crystal displays.

Figure 4:
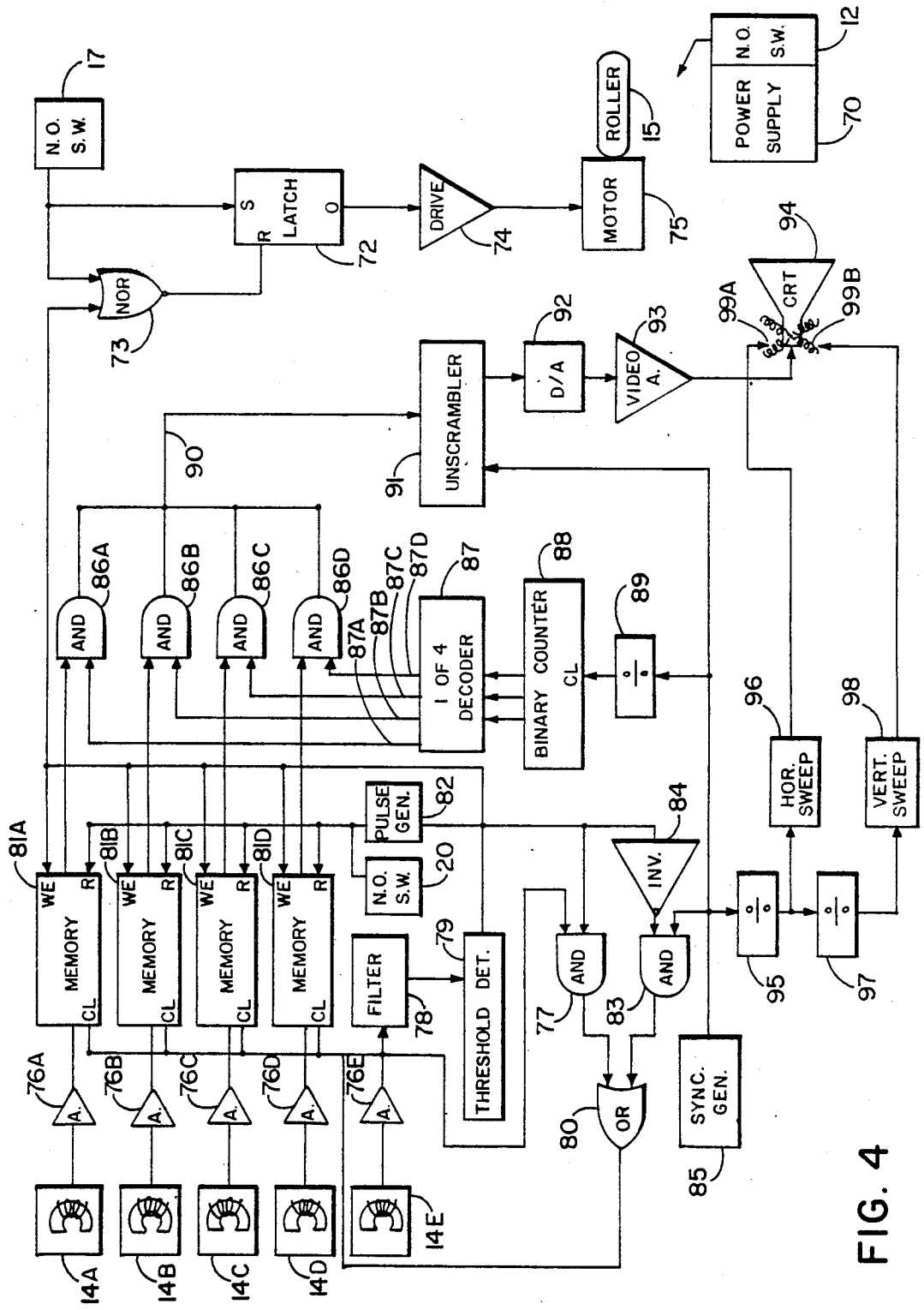
FIG. 4 is a schematic diagram of a modified form of the system shown in FIG. 3

In FIG. 4 is shown a personal identification system 70, which may supplement or be used separately from the system shown in FIG. 3, for displaying a television image of the face of the person presenting the card 22 and/or his signature. The television image results from video signals, such as analog or digital signals, recorded on or reproduced from card 22 as it is driven through the card reading unit 13. Such video signals may be standard digital recordings derived from images in a scrambled or unscrambled state and may include a code word or number, name of the person or other symbol to be displayed together with the image of the face of the person, when the card is read and the video signals reproduced therefrom.

Activation of the card driving means is similar to that described wherein power is transferred from a power supply 71 to the electronic circuitry illustrated when an on-off switch 12 is closed. Card 22 is then placed between guided 13A and 13B and read switch 17 is manually closed or closed by the card which sets a latch 72 while relieving a reset input R to said latch of its true signal through a N OR gate 73, which allows the output of latch 72 to activate a motor driver 74 transferring operational power to motor 75 which rotates roller 15 and drives the card 22 past the read head assembly 14. In this case, five magnetic pickups or reproduction transducers 14A, 14B, 14C, 14D and 14E sense information recorded on five respective tracks of the card and convert the recordings to electrical signals which are amplified by respective amplifiers 76A, 76B, 76C, 76D and 76E. Video information is reproduced by heads 76A-76D while head 76E reproduces signals from a separate recording track containing sync signals which serve to synchronize the recorded information with the information displayed as follows:

The signals generated on the output of amplifier 76E are control track sync pulses which are transmitted to one input of an AND gate 77 and also conducted to a filter 78 which produces a DC output level which is proportionate to the AC input signals. The DC output level is sensed by a threshold detector 79 which provides a true signal to the other input of AND gate 77 whenever the output of filter 78 exceeds a predetermined level. When both inputs to the AND gate 77 are true or coincident, the aforementioned sync pulses from the control track amplifier 76E are conducted through AND gate 77 and an OR gate 80 to the clock inputs of a series of shift register memories 81A, 81B, 81C and 81D which serve to shift the input data from the amplifiers 76A, 76B, 76C and 76D into their respective registers.

When the output of threshold detector 79 is true, the contents of memories 81A-81D are momentarily cleared through a pulse generator 82 which connects to the reset input of the memories 81A-81D. The output of threshold detector 79 also provides a true signal which is passed to the write-enable inputs of memories 81A-81D permitting them to acquire data from their inputs. This process continues until the recordings on the magnetic recording tracks of the recording material 23 have been read and no further recordings pass the control track head 14E.

Threshold detector 79 senses such condition and then deactivates its output as the DV level present at its input from amplifier 76E through filter 78, drops below the preset value. Such deactivation causes a true signal to appear at the output of the NOR gate 73 which resets latch 72, thereby deactivating the motor driver 74 and stopping the motor 75. As the output of threshold detector 79 is deactivated, a true input signal is transmitted to the AND gate 83 through an inverter 84. The other input to the AND gate 83 is derived from a sync generator 85 which generates a continuous series of pulses at a proper rate, such as one pulse per bit, so as to display the video data on a cathode ray tube or other video display device. Whenever a true input to AND gate 83 is received from inverter 84, sync pulses from the sync generator 85 are transmitted to the clock inputs of memories 81A-81D through an OR gate 80 and serve to circulate date from memories 81A-81D at the clock rate of the sync pulses.

Each of the outputs of memories 81A-81D extend to respective inputs of AND gates 86A, 86B, 86C and 86D. The other inputs to the AND gates 86A-86D respectively extend from the outputs 87A-87D of a 1 of 4 decoder circuit 87. Such circuit arrangement will cause sequential activation of the AND gates 86A-86D by the outputs of a binary counter 88 which is driven by signals received from a divider circuit 89, the input of which is connected to the output of sync signal generator 85. The memories 81A-81D are thereby sequentially connected to the memory bus 90 for a period during which a sufficient number of clock pulses, equal to the number of data bits in each of the memories 81A-81D, to allow the entire contents of such memories to be transferred to bus 90 in proper order.

Memory bus 90 is connected to the input of an unscrambler 91 which unscrambles the information received in accordance with sync signals received from sync generator 85 which are employed to synchronize the unscrambling operation. The output of unscrambler 90 is transmitted to an analog-to-digital converter 92 which is connected to a video amplifier 93 which applies the video information signals so amplified to the display cathode ray tube 94 for displaying the video information. Video read beam deflection and intensity control signals are derived from the outputs of horizontal and vertical sync signals generators 96 and 98 which are driven by signals generated by sync generator 85 and passed to dividers 95 and 97 wherein the video picture signal elements generated on the output of the video amplifier 93 are synchronously received by the cathode ray tube 94 with such horizontal and vertical sweep signals derived from the signal generators 96 and 98 which are connected to the respective horizontal and vertical deflection circuits 99A and 99B of the cathode ray tube.

System 70 may be reset to clear the image displayed by activation of the reset switch 20 which serves to clear all of the memories 81A-81D by activating their respective reset inputs.

In FIG. 14, a modified form of the systems 10 and 70 is shown in which one of several codes may be automatically employed by timing means which is reset by signals generated in reading the record card 22. Such codes may be chosen by a computer and entered into a non-volatile memory of a system 100 at the time the system is fabricated and may also be recorded on the recorded area of the card 22 prior to its issuance. As a result, human operators need not have knowledge of the codes so chosen, providing additional assurance against fraud.

Magnetic reproduction head assembly 14 converts signals picked up from the record track of the card recording area 23, which signals are passed to an amplifier 101 and output therefrom to a decoder 102 and converted to digital form for presentation to a code comparator 103.

Also provided in FIG. 5 is a clock signal generator 104 which may operate continuously to generate one pulse per day, week, month or year so as to provide such pulses to an address pointer 105 which counts the pulses received and produces address codes on its parallel outputs which extend to a read only memory (ROM) 106 which transfers the preprogrammed code recorded therein at the address defined by the address code to a code comparator 103 for comparison with codes received from a decoder 102. When code matching or comparison is effected in comparator 103, an output signal is generated thereby and applied to the set input S of a latch 107. The latch output activates a lamp driver 108 providing operating current for an indicator lamp 109 notifying the clerk or operator of the authenticity of the card.

System 100 may be reset for the next verification cycle by momentary activation of the reset switch 120 which is connected in FIG. 5 to the reset input R of the latch 107.

It should be understood with respect to all of the embodiments described and illustrated herein, that power supplies having the correct polarities and magnitudes are provided where not illustrated or indicated in the drawings so as to supply proper electrical energy for appropriately operating various illustrated components and circuits as described in the specification.

We claim:

1. A personal identification system comprising in combination:
   (a) an identification recording area disposed on a hard copy record card member which includes visually readable print indicia thereon and may be carried by a person as identification documentation of said person, said recording area containing recorded scrambled information defining a physical characteristic of said person to identify said person carrying the record member,
   (b) first means for reading said recorded scrambled information from said recording area and generating electrical signals representative of the scrambled information recorded therein,
   (c) second means for processing said scrambled electrical signals to produce unscrambled electrical signals,
   (d) third means including a variable display means and electrical control means for controlling operation of said display means,
   (e) said third means being operable to receive from said second means said unscrambled electrical signals and employ same to display on said display means an image in a form permitting monitoring said display means to determine the true physical characteristics of the person recorded in the identification recording area on said hard copy record card member.

2. A personal identification system in accordance with claim 1 wherein
   the information recorded in said record member is image information derived from video scanning a physical characteristic of a person to be identified.

3. A personal identification system in accordance with claim 2 wherein
   the information recorded in said record member is image information derived from scanning the face of a person to be identified and
   said third means includes a video receiver including a video display screen and means for generating video images on said display screen of the faces of persons as defined by the unscrambled electrical signals received by said third means from said second means.

4. A personal identification system in accordance with claim 2 wherein
   the information recorded in said record member is image information derived by scanning a physical characteristic associated with a person,
   said third means includes a television receiver, a cathode ray tube, and means for generating and retaining still images on the viewing screen of said cathode ray tube.

5. A personal identification system in accordance with claim 1 wherein
   the recording on said record member is a scrambled full-frame video picture signal,
   said second means is operable to generate and present to said third means a full-frame video picture signal, and
   means connected to the second means to receive signals from said first means for unscrambling said signals and generating a full-frame video picture signal of the physical characteristics of a person to be identified for presentation to said third means.

6. A personal identification system in accordance with claim 1 wherein
   said recording on said record member is composed of digital signals derived by scrambling and digitizing a full-frame video picture signal derived from a television camera scanning the face of a person to be identified by said personal identification system.

7. A personal identification system in accordance with claim 1 wherein
   said recording on said record member is composed of digital signals derived by scrambling and digitizing a full-frame video picture signal derived from a television camera scanning the signature of a person to be identified by said personal identification system.

8. A personal identification system in accordance with claim 1 further including
   means for generating code signals derived from digital signals generated by sensing sounds generated by words spoken by a person to be identified, comparator means connected to receive said code signals, a microphone for converting voice sounds spoken therein to electrical signals, means for digitizing and coding the output of said microphone and presenting such coded output to said comparator means for comparison with the signals generated by said first means in reading the signals recorded in said record member after said signals are processed and unscrambled by said second means, said comparator means being operable to control operation of said display means to indicate to a person monitoring said display means if the voice sounds spoken by a person speaking into said microphone are generated by the same person whose spoken words are defined by the recordings reproduced from said record member.

9. A method of automatically identifying a person comprising:
(a) generating first electrical signals representing information derived from detecting a physical characteristic of a person automatically identify said person having said physical characteristic and distinguish said person to from other persons,
(b) scrambling said first electrical signals to provide them in a cryptographic form,
(c) recording said scrambled electrical signals in an identification recording area on a hard copy record card member which includes visually readable print indicia thereon and may be carried by said person as identification documentation of said person,
(d) reproducing said scrambled recordings as scrambled electrical signals to identify the person represented by the scrambled recordings on said hard copy record card member,
(d) receiving the reproduced scrambled recordings and unscrambling same to generate unscrambled electrical signals defining the physical characteristics of the person detected to generate said first electrical signals, and
(f) applying said unscrambled electrical signals to produce a personal identification function.

10. A method in accordance with claim 9 wherein
said first electrical signals are generated by a television camera scanning a physical characteristic of a person.

11. A method in accordance with claim 10 wherein
said television camera is operable to scan the face of said person and said unscrambled electrical signals are applied to a television monitor and are operable to generate a still image on the viewing screen of the monitor which image includes that of the face of the person to be identified.

12. A method in accordance with claim 9 wherein
said first electrical signals are generated by digitizing the output of a microphone into which the person to be identified is speaking and scrambling signals derived from such digitizing, and
identification is effected by reproducing the recordings of such scrambled digital signals, unscrambling same and presenting the unscrambled digital signals to a code comparator,
generating voice signals on the output of a second microphone derived when a person speaks into such second microphone,
digitizing said voice signals and presenting same to said comparator for comparison with the code signals derived from the reproduced and unscrambled signals generated from the recordings thereof.

13. A method of identifying a person comprising:
(a) having a person who is to be automatically identified at a time in the future speak a selected word into a microphone to generate an output analog signal defining said selected word spoken in the voice of the person to be identified,
(b) digitizing said output analog signal and generating scrambled digital signals which are representative of the word spoken and the voice pattern of the person speaking such selected word,
(c) recording said scrambled digital signals in an identification recording area on a hard copy record card member which includes visually readable print indicia thereon and may be carried by said person whose voice pattern is recorded as identification documentation of said person, and
(d) when it is desired to identify the person presenting said record member for identification, reproducing said scrambled digital signal records from the identification recording area on said hard copy record card member as electrical signals,
(e) applying such electrical signals to first inputs of a comparator circuit,
(f) having the person presenting the record member for identification speak the same word which was spoken to generate the signals recorded in the identification area on said record member into a microphone,
(g) processing the electrical signal output of said latter microphone including digitizing same, also presenting the signals derived by such processing to said comparator circuit and generating an output signal when said comparator circuit detects coincidence between the signals received from said latter microphone and the signals generated in reproducing the recordings from said identification recording area as an indication that the signals reproduced from said identification recording area and generated on the output of said latter microphone were derived from transducings of speech of the same person.

14. A method of automatically identifying a person comprising the steps of:
(a) generating a plurality of composite full-frame video signals representing information derived from detecting a physical characteristic of a person to automatically identify said person having said physical characteristic and distinguish said person from other persons,
(b) scrambling said composite full-frame video signals to provide them in cryptographic form,
(c) recording said scrambled composite full-frame video signals along respective parallel tracks of an identification recording area on a hard copy record card member carried by said person as identification documentation of said person,
(d) reproducing said scrambled recordings as scrambled electrical signals to identify the person represented by the scrambled recordings in the identification area on said hard copy record member,
(e) receiving the reproducing scrambled recordings and unscrambling same to generate unscrambled full-time video signals defining the physical characteristics of the person detected, and
(f) presenting the reproduced full-frame video signals to a video monitor and using same to generate a viewable image representative of the recorded information in the identification recording area.

* * * * *